(12) United States Patent  (10) Patent No.: US 8,599,440 B2
Pepin et al.  (45) Date of Patent: Dec. 3, 2013

(54) METHODS AND APPARATUS FOR ADJUSTING INK PILE HEIGHT

(75) Inventors: Louis Omer Joseph Pepin, Rochester, NY (US); Jean-Pierre Van De Capelle, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1009 days.

(21) Appl. No.: 12/647,975

(22) Filed: Dec. 28, 2009

(65) Prior Publication Data

US 2011/0157605 A1  Jun. 30, 2011

(51) Int. Cl.
*H04N 1/407* (2006.01)

(52) U.S. Cl.
USPC ........... 358/3.26; 358/1.2; 358/1.9; 358/3.22; 358/3.23; 358/518

(58) Field of Classification Search
USPC .......... 358/1.9, 1.16, 1.15, 3.26, 1.2, 2.1, 3.1, 358/3.11, 3.12, 3.22, 3.23, 1.18, 296, 518, 358/530, 533; 382/190, 199, 200, 201, 266, 382/267, 268, 269, 270
See application file for complete search history.

(56) References Cited

U.S. PATENT DOCUMENTS

| | | | |
|---|---|---|---|
| 5,689,344 A | 11/1997 | Ebner | |
| 5,754,302 A * | 5/1998 | Coleman | 358/296 |
| 5,838,885 A * | 11/1998 | Shu et al. | 358/1.9 |
| 6,352,806 B1 | 3/2002 | Dalal | |
| 2007/0177181 A1 | 8/2007 | Herr | |

* cited by examiner

*Primary Examiner* — Vu B Hang
(74) *Attorney, Agent, or Firm* — Oliff & Berridge, PLC

(57) ABSTRACT

A method and apparatus for adjusting estimated ink pile height to reduce the frequency and effects of a defect known as a halo defect. An estimated ink pile height profile of ink to be deposited on a surface in an area of image data having a foreground and a background is determined. The estimated ink pile height profile has a foreground color area including a top color component and at least one non-top color component in the foreground. Then, the estimated height profile is adjusted if the difference between the pile heights of the foreground and background is greater than a threshold condition.

16 Claims, 12 Drawing Sheets

METHODS AND APPARATUS FOR ADJUSTING INK PILE HEIGHT

BACKGROUND

This application relates generally to ink xerography and printing, and/or ink jet printing. Various embodiments disclosed herein are directed to methods and apparatus for reducing imaging artifacts known as halos in color copiers. For example, ink pile height may be adjusted in color xerographic images through image processing ink coverage reduction methods.

Color images are commonly represented as one or more separations, each separation comprising a set of color density signals for a single primary, secondary, tertiary or multiple colors. The color density signals are commonly represented as digital gray or contone inks, varying in magnitude from a minimum to a maximum, with a number of gradations between, corresponding to the bit density of the system. For example, a common 8-bit system provides 256 shades of each separation color. A color of ink can therefore be considered the combination of intensity of each color separation for that ink, which when viewed together, present a combination color. Usually, printer signals include three primary colors cyan (C), magenta (M) and yellow (Y) signals and a black (K) signal, which collectively can be considered the printer color signals. Each color signal corresponds to a separation, and when combined together with the signals corresponding to the other separations forms the color image. For printing, each separation causes a layer of toner to be deposited on a toner receiving substrate. The combined layers form the color image.

Multi-color electrophotographic printing machines which use multi-colored toners are substantially identical in each color image forming process to the process of black-and-white printing, which uses only black toner. However, rather than forming a single latent image on the photoconductive surface, several single color latent images corresponding to color-separated images of the original document are recorded on the photoconductive surface. Each single color electrostatic latent image is developed with toner particles of the corresponding color. This process may be performed in a single pass, or in multiple passes during which image formation is repeated a plurality of cycles for differently colored images using their respective corresponding colored toner particles to form color toner images. Each single color toner powder image is transferred to a copy sheet in superimposed registration with the other toner powder images. Alternatively, there can be an intermediate transfer that takes place on a surface other than the paper (copy sheet), and subsequently transferred to the copy sheet in a second transfer.

This creates a composite multi-layered toner powder image on the copy sheet. The copy sheet is separated from the photoconductive member or intermediate transfer surface and, thereafter, the multi-layered toner powder image on the sheet is fed through a fusing apparatus and permanently affixed to the copy sheet, thus creating a multi-color document. In a black and white or multi-color electrophotographic printing machine, the copy sheet is typically brought into moving contact with the photoconductive member or intermediate transfer surface during toner powder image transfer to the copy sheet. A sheet transport apparatus is typically provided for receiving the copy sheet continuously as it is incrementally separated from the photoconductive member, and for transporting the copy sheet towards and into the fusing apparatus.

In recent years, so-called preflight softwares have been developed. Such applications test print submissions for features that may cause possible defects (e.g., missing fonts, inappropriate raster image resolution, use of spot colors on a process color device, color spaces, and the like). Often users may select from among hundreds of possible criteria. Preflight software packages now form an established part of the printing industry and include offerings from a range of vendors.

Contone raster images in, for example, a CMYK print engine's color space, use multiple bits per ink to represent their output. Formats may vary, but very commonly eight bits are used to represent each color. Hence, for a CMYK raster image including four colors (cyan, magenta, yellow and black), 32 bits are used to represent each ink. In general, a contone raster image can become device-dependent when a color decomposer converts an output that is targeted for a CMYK printer to the CMYK color space, during which process any current rendering information is applied. The resulting decomposer output files then contain the CMYK data needed to target a specific output device. Examples of contone raster image files include TIFF 6.0 Technical Note #2 files, and contone raster images stored in Portable Document Format (PDF) files by a JPEG compression algorithm. The above-described examples of raster image files may also be contained in Page Description Language (PDL) files. Examples of PDLs include Adobe Postscript, Adobe Portable Document Format (PDF) and Hewlett Packard's Page Composition Language (PCL).

SUMMARY

This disclosure is directed to methods and apparatus for reducing imaging artifacts known as halos in color copiers, by adjusting ink pile height in color xerographic images through image processing ink coverage adjustment.

In some color xerographic and electrophotographic printers, and with some object types, an imaging artifact is noted at the intersection of higher density and lower density areas. This artifact is known as a halo and will be described in more detail below. It appears as a faint halo effect in the lower density area. The artifact may arise at the transfer step and be caused by the inability of a substrate to conform to the imaging surface due to the higher pile height of the higher density area. In any case, the artifact is particularly notable with line art and text printing, particularly when dark text is printed on a colored background.

Methods of adjusting ink height, and an image processing apparatus for performing the method, are discussed herein. In embodiments, in an area of image data having a foreground and a background, an estimated ink pile height profile of ink to be deposited on a surface by an image forming device is determined. The estimated height profile has a major color component in the foreground and at least one non-major color component. The estimated height profile may be adjusted through a spatially dependent change of ink at the area until the adjusted ink pile height difference in the area is below a threshold. Printing may subsequently be performed based on the adjusted estimated height profile.

In some embodiments, the major color component is a color such as black that visually dominates a combination of the major color component and the at least one non-major color component. In other embodiments, the major color component is a dark color, such as a dark blue, or dark brown. In yet other embodiments, the major color component is an opaque ink that is located on the top of the estimated ink pile height at the foreground, and the at least one non-major color component is not located on the top of the estimated ink pile height at the foreground.

Some embodiments include scaling each of the at least one non-major color component of the foreground by some factor so that the foreground exclusive of the major color component and the background have the same estimated height.

In some embodiments, the estimated ink pile height of the background is increased by scaling the at least one non-major color components of the background.

Some embodiments include the image data being raster image data while other embodiments include the image data being vector data.

In some embodiments, the image data is in the color space of the image forming device before the determining of the estimated height profile.

In some embodiments, one of the at least one non-major color component of the foreground that is least represented out of non-major color components of the background is removed. These embodiments may include further iteration of this step.

In some embodiments, the amount of each non-non major color component in the foreground is equated with the corresponding color component in the background.

Some embodiments include scaling each of the at least one non-major color component of the foreground area by some fraction so that the foreground inclusive or exclusive of the major color component and background have the same estimated height.

In some embodiments, the steps of determining and adjusting are performed in a preflight application.

Some embodiments are implemented in or as a xerography machine, a computer, a printer, a press or a multifunction machine.

Some embodiments include increasing the estimated height of the background by scaling the color components of the background. In other embodiments the estimated pile height of the background is made closer to the estimated pile height of the foreground by adding missing color components.

Some embodiments include rastering the image data wherein the step of rastering occurs before the step of determining.

BRIEF DESCRIPTION OF THE DRAWINGS

Exemplary embodiments will be described with reference to the drawings, wherein like numerals represent like parts, and wherein.

EMBODIMENTS

Figure 1:
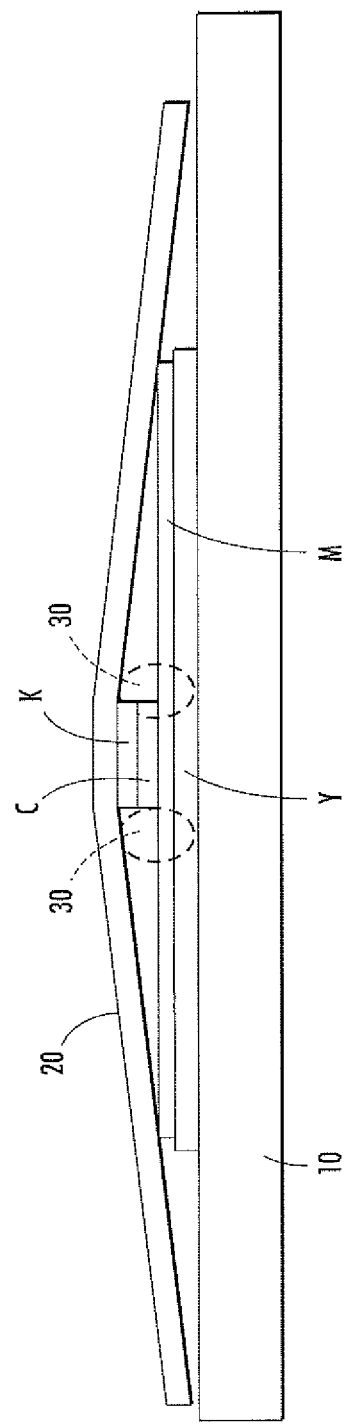
FIG. 1 is an illustration of an image transfer situation wherein a halo defect can arise.

FIG. 1 is an illustrative example depicting a difference in ink pile height of adjacent printed objects that may cause an image defect called a halo. A halo results from incomplete image transfer caused by this difference. In this example, component colors C, M, Y and K are deposited on an intermediate transfer belt 10. Y is the first layer of ink deposited on the intermediate transfer belt 10, followed by a layer of M. Two more layers, C and K, are deposited above the M and Y layers.

CMYK color space is a common color space for printers, color copiers, xerography devices and the like. Although the apparatus and methods described herein will be described using CMYK, these apparatus and methods are applicable to other color spaces.

The pile height of toner or ink will be defined as the sum of the component pile heights of toner or ink on a surface. For example, in a CMYK color space, the pile height $\Pi$ can be represented by the following equation.

$$\Pi = \Pi_y + \Pi_m + \Pi_c + \Pi_k \quad \text{(equation 1)}$$

FIG. 1 depicts adjacent piles of ink of a printed black character on a red background. The leftmost pile has layers Y+M. The center pile has layers Y+M+C+K. The rightmost pile consists of Y+M. In this depiction, each ink color has a similar vertical height, although the embodiments described herein are not limited to the configuration. As such, the leftmost and rightmost piles have a height of about one half the height of the center pile.

Differences in ink pile height of adjacent printed objects create difficulties in completing image transfer from the intermediate transfer belt 10 onto heavy weight media, depicted in FIG. 1 as paper 20, in xerographic marking devices. Paper 20 bridges the step formed by the ink pile height difference, creating an air gap 30 that may prevent proper electrostatic transfer of the image to the paper 20. This problem tends to be more prevalent when using heavy weight media, for instance, for those media greater than 210 g/m² (European units) or 80 lb cover (U.S. units).

For example, differences in ink pile height can occur when an adjacent image color contains one or more separations of ink than its neighbor. Specifically, a four color black CMYK foreground in a two or three component color CMY background can be problematic.

Figure 2:
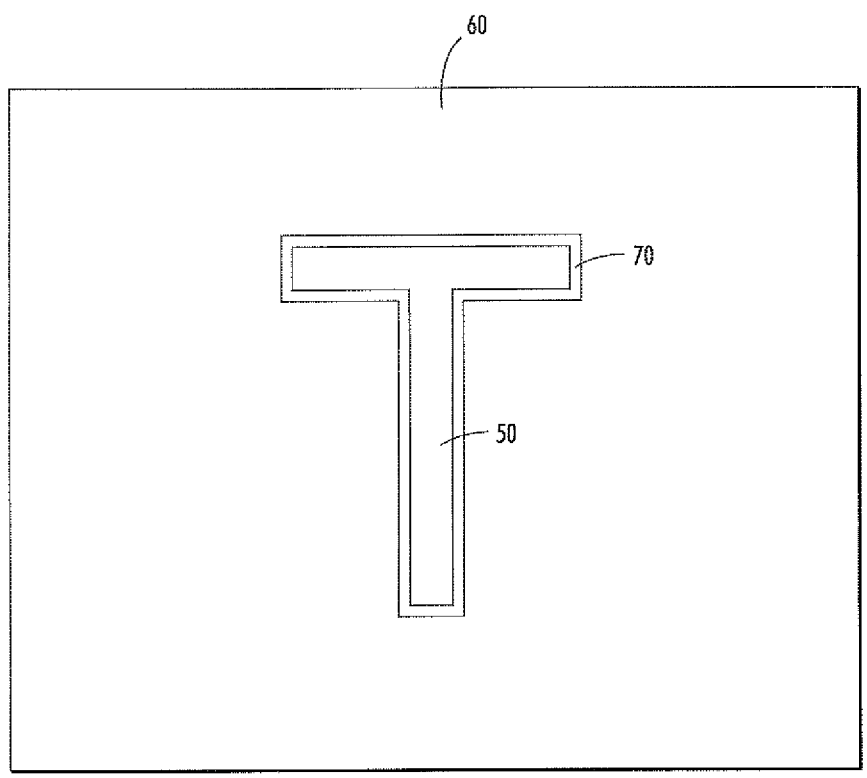
FIG. 2 is an illustration of a halo defect caused with a printed character.

FIG. 2 is an illustration of a transferred image of FIG. 1 showing the incomplete image transfer from the intermediate transfer belt 10 onto the paper 20 at the positions of the air gaps 30. FIG. 2 depicts a black (C+M+Y+K) character "T" in the foreground 50 on top of a reddish (Y+M) background 60. Here, a pink/magenta halo defect 70 is formed in the area adjacent to character "T." The halo defect 70 is due to incomplete image transfer of the M layer at the locations corresponding to the air gaps 30.

Printing using known methods of black knock out, where all color components are removed under black K, or grey component replacement (GCR), where CMY color components are reduced and the black (K) color component is increased, do not make the ink pile height more consistent. GCR is a technique to increase black while reducing CMY. The embodiments described herein solve problems occurring in situations where K is already maximal (i.e., 100%) or close to maximal. Hence GCR would have little or no effect on the CMYK values and therefore have little or no effect on the ink pile height. Therefore GCR would not solve the problem described in this invention. Black knock out is the "complete removal" of a first object that is "beneath" a second object with a very large black component, e.g. 100% K, and no other color components. This avoids high pile height, but does not work when the second object contains all four color components. Black knock out can also produce white lines when there is a mis-registration between the black and the other colors, in which case trapping is required to mitigate the white gap. Known methods of trapping cannot alleviate the halo because ink pile height differences causing air gaps 30 may still be present after trapping.

The apparatus and methods described herein improve printing, copying and/or xerography at least at locations where the halo defect tends to occur. In image processing, areas of composite-color black are compared to the expected surrounding colors to determine which of the composite colors can in part or in total be adjusted to better equalize the ink pile height to the surrounding developed area. The apparatus and methods disclosed herein can automate ink pile height adjustment for developed images, graphics, and text objects. An additional advantage of exemplary embodiments is the ability to print text or graphics onto graphics without the presence of surrounding halos. These fixes can be at the local level, and do not need to globally change the image. In addition, the ink pile height adjustment also helps to reduce differential gloss resulting, e.g., from high ink mass regions. This effect may apply to all media weights, not just heavy media weights.

Figure 3:
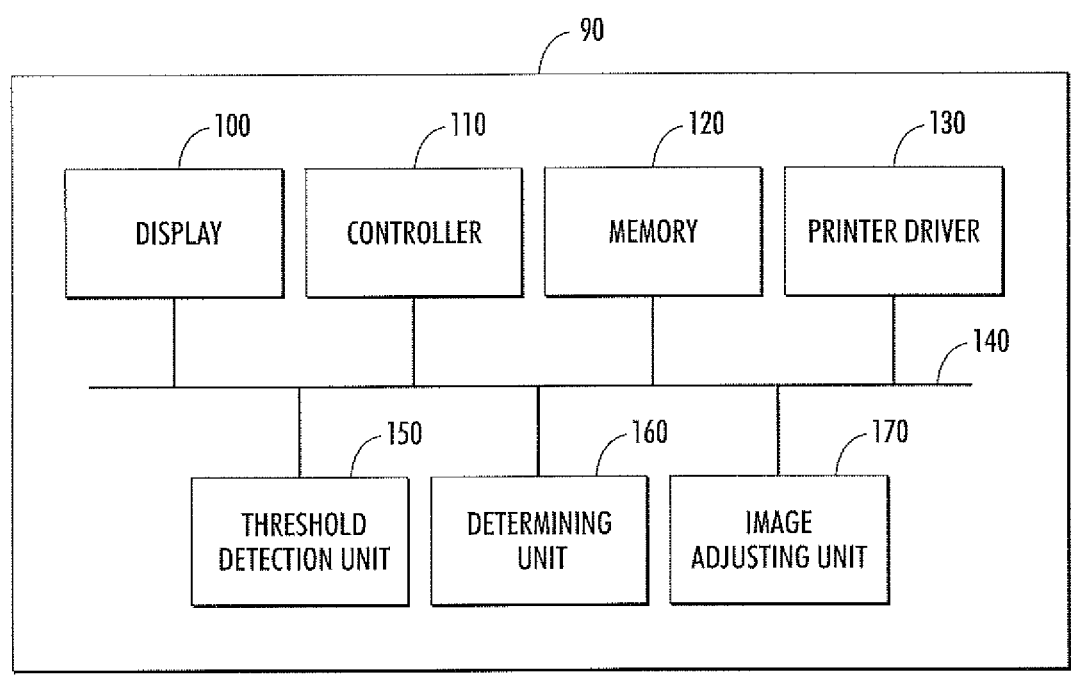
FIG. 3 is a functional block diagram illustrating a first exemplary embodiment of an image processing apparatus.
Figure 4:
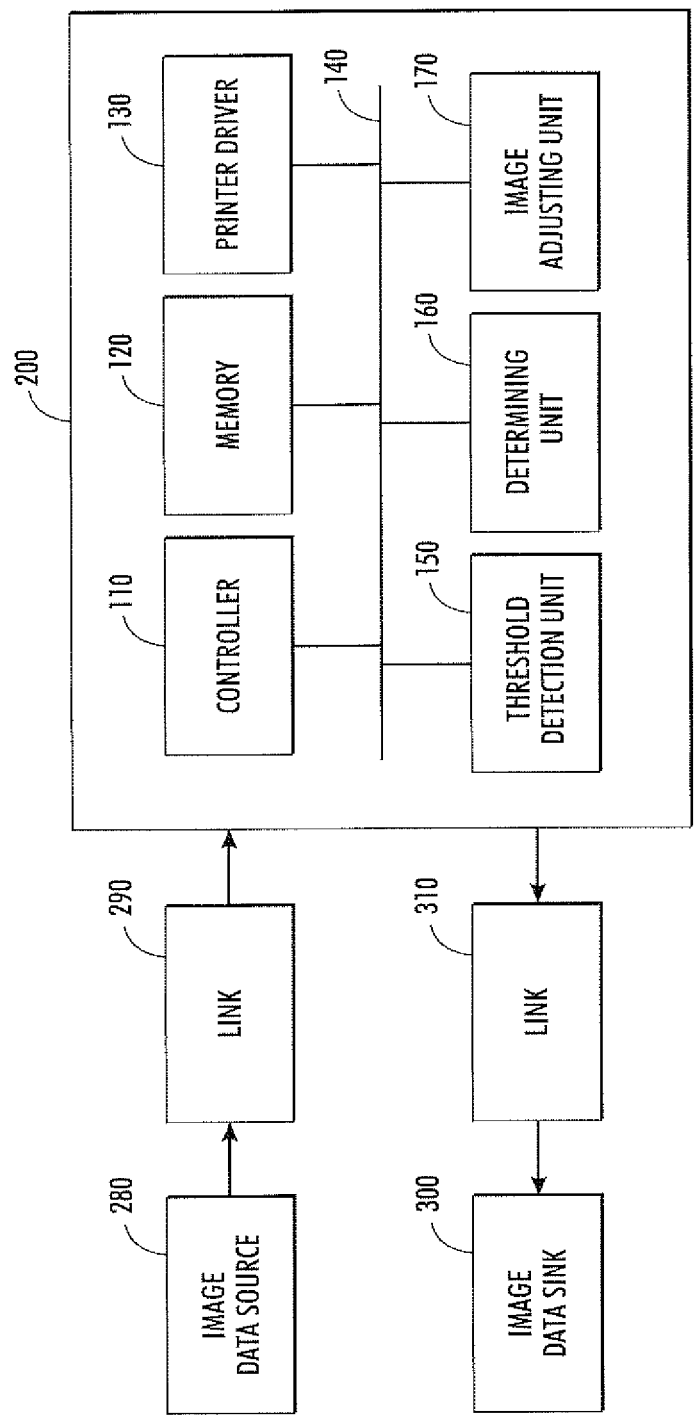
FIG. 4 is a functional block diagram illustrating a second exemplary embodiment of an image processing apparatus.

FIGS. 3 and 4 are functional block diagrams illustrating first and second exemplary embodiments of image processing apparatus 90 and 200.

Image processing apparatus 90 includes a threshold detection unit 150, a determining unit 160, and an image adjusting unit 170, which will be described in further detail below. Image processing apparatus 90 may also include a display 100, a controller 110, a memory 120, a printer driver 130 and a bus 140. Specific examples of the image processing apparatus 90 include, according to the embodiments within this disclosure, a computer, a workstation, a printer, a press, a copier, a xerographic device, a facsimile machine, or a multifunction device. The image processing apparatus can be for personal or commercial production use. The display 100 can be a monitor, screen or the like by which a user can view images. A user may provide input to image processing apparatus 90 through an input device (not depicted) such as a keyboard, mouse or the like.

The threshold detection unit 150 can check whether a threshold condition for the step of adjusting the estimated height profile is satisfied. The determining unit 160 can determine in an area of image data an estimated height profile of marking material to be deposited on a surface by an image forming device. The image adjusting unit 170 can adjust the estimated height profile in the image area.

The controller 110 controls the operation of other components of the image processing apparatus 90, performs any necessary calculations and executes any necessary programs for implementing the processes of the image processing apparatus 90 and its individual components, and controls the flow of data between other components of the image processing apparatus 90 as needed.

The memory 120 may serve as a buffer for information coming into or going out of the image processing apparatus 90, may store any necessary programs and/or data for implementing the functions of the image processing apparatus 90, and/or may store data at various stages of processing. Further, it should be appreciated that the memory 120, while depicted as a single entity, may actually be distributed. Alterable portions of the memory 120 are, in various exemplary embodiments, implemented using RAM. However, the memory 120 may also be implemented using disk storage, optical storage, flash memory or the like.

The image processing apparatus 90 can be internally or externally connected to an image data source and an image data sink (not depicted) via an input/output interface (not depicted). The image data source can be a digital camera, a scanner, a document layout program, an art design program, a word processing program or other document generating program executing on a locally or remotely located computer, or any other known or later developed device that is capable of generating electronic image data. The image data can be any file types associated with these types of programs, and may include photographs, graphics, text and documents. Similarly, the image data source can be any suitable device that stores and/or transmits electronic image data, such as a client or a server of a network. The image data source can be integrated with the image processing apparatus 90 or be connected over a connection device, such as a modem, a local area network, a wide area network, an intranet, the Internet, any other distributed processing network, or any other known or later developed connect device. The image data sink receives the processed data of the image processing apparatus, and may, for example, be a printer or a storage device that stores the processed data for later output. The image data sink can also be integrated with the image processing apparatus 90, for example, in the case in which the image processing apparatus 90 is a stand-alone printer. Bus 140 can be used for communicating internally or externally between components of image processing apparatus 90.

A color image is inputted into the image processing apparatus 90. In the embodiment of FIG. 3, specific examples of the color images include images, pages, or documents described in a page description language (PDL). The color of the elements on the page can be described using a number of color spaces, such as in an RGB color space or an in a CMYK color space. The image processing apparatus 90 may also include other processing modules for various PDLs, for example, an interpreter, a flattener, etc. The interpreter may translate Postscript language into object level data. The flattener determines the relative location of the objects in the object level data and can convert layers of objects into a single layer. For simple jobs that are in standard image format, e.g. JPEG or TIFF, the interpreter and the flattener may only deal with simple processes such as resealing, rotation, and translation. Before rasterization, the color image may contain object information. Other specific examples of the color image can be a scanned-in photograph, a document output from a word processing program, or any type of file that can be sent to an image marking device. Within the image processing apparatus 90, the color images enter into threshold detection unit 150, determining unit 160, and image adjusting unit 170 in single or iterating step(s). The image processing apparatus 90 also may include print driver 130, for controlling and communicating with an internal or an external printer.

The image processing apparatus 90 may include a preflight tool, such as a preflight printing component of a software program. Preflight can be an operation in electronic prepress wherein a supplied electronic file is evaluated to determine if all of the elements necessary to print from it are included and useable. Electronic prepress refers to production methods involving desktop publishing, scanning of artwork or photos, film output or plate output from an imagesetter, or direct to print production, before any ink or toner is applied to the print media. In an automated workflow process, preflight can be performed by a computer program that evaluates the file and advises of possible problems in a preflight report. An example of a preflight program is available in U.S. patent application Ser. No. 11/726,636 entitled "Preparation of production data for a print job using a still image proxy of a page description language image file."

When an application such as preflight software knows in advance what printer will be used, the application can check to make sure the user is not creating a condition that would lead to the halo defect. If it is determined that the conditions are favorable to the halo defect, the application would then notify the user of the condition and equalize the ink pile height or automatically fix the problem without the user needing to be aware of the processing. The application may make this determination by, for example, automatically looking at the foreground and background objects using the methods described below, e.g., windowing and thresholding. The pile height adjust ent can be run with other checks on the preflight checklist.

The term "ink" includes, but is not limited to, toner inks, wax-based inks, solid inks, liquid-based inks and the like. Although halo defects are caused less frequently with liquid-based inks that adsorb into the substrate, the apparatus and methods herein can still be applied to reduce any halo effects caused by such inks.

The major ink can be an opaque ink or a dominating ink. The embodiments discussed herein can differ depending on whether an opaque or a dominating ink is used. A dominating ink is defined as an ink whose color visually dominates even when used within a combination of other colors. For example, a black or a dark blue can be a dominating ink. Such inks usually have a low light transmittance and a high reflectance. If the dominating ink is used with other ink colors, the combination of inks will still be close to the color of the dominating ink.

FIG. 4 illustrates a functional block diagram of image processing apparatus 200. Image processing apparatus 200 is a second exemplary embodiment. Elements corresponding to those of the first embodiment will not be further described here. In this embodiment, the image processing apparatus 200 processes images either concurrently with raster-image processing or following raster image processing. Unless otherwise noted, the components in the second embodiment are the same as those in the first embodiment.

In the embodiment of FIG. 4, a specific example of the color image is a raster image, e.g., an image in CMYK color space. Image processing apparatus 200 includes a determining unit 160, a threshold detection unit 150 and an image adjusting unit 170. Image processing apparatus 200 may also include a controller 110, a memory 120, a printer driver 130 and a bus 140.

Image processing apparatus 200 may receive image data from an external device such as an image data source 280 through a link 290, process an image, and transmit the image to an external device such as an image data sink 300 through a link 310. The links 290 or 310 can be any known or later developed system or device for transmitting the electronic image data to or from image processing apparatus 200. Further, it should be appreciated that the links 290 and 310 can be a wired, wireless or optical link to a network (not shown). The network can be a local area network, a wide area network, an intranet, the Internet, or any other distributed processing and storage network. Alternatively, the image processing apparatus 200 may internally include image data source 280, link 290, image data sink 300 and link 310. Specific examples of the image processing apparatus 200 include, according to the embodiments within this disclosure, a computer, a workstation, a printer, a digital press, a copier, a xerographic device, a facsimile machine, or a multi-function device.

Figure 5:
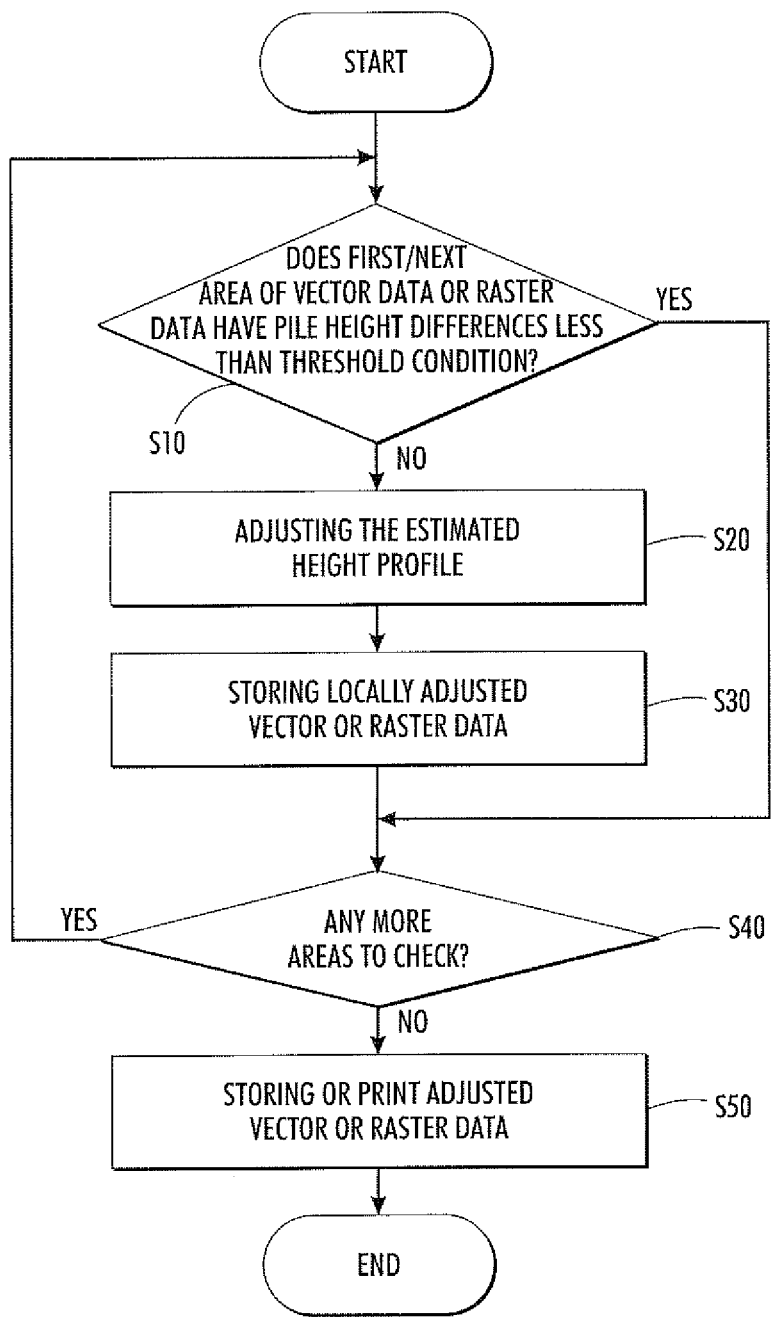
FIG. 5 is a flowchart illustrating an exemplary image processing method.

FIG. 5 illustrates an exemplary method to provide a consistent ink pile height across an area of a printed document. The area can include a black object, such as text or a graphic object, which is printed against a color background.

In some cases the black object is printed as CMYK and not as K. As discussed above, when the black CMYK object is printed next to a background with smaller ink pile height, then the background color may not transfer completely to the media, because of a small air gap between the media and the ink on the belt.

Equation 1, described above, can be adapted to a foreground (FG) and a background (BG), as shown below in equations 2 and 3. These equations show the components of the pile height of a black object in the foreground and the pile height of the background.

$$\Pi_{PG} = \Pi_{Fy} + \Pi_{Fm} + \Pi_{Fc} + \Pi_{Fk} \quad \text{(equation 2)}$$

$$\Pi_{BG} = \Pi_{By} + \Pi_{Bm} + \Pi_{Bc} + \Pi_{Bk} \quad \text{(equation 3)}$$

Methods according to embodiments of the disclosure can reduce the estimated foreground pile height or build up the estimated background pile height within an area in the image plane to make pile heights more uniform. These methods can iteratively process an image until a condition similar to $|\Pi_{FG} - \Pi_{BG}| \leq Th$ is satisfied, wherein Th is a threshold value. Although adjustment can be performed before or at the time of printing, the pile heights are estimated because printing has not taken place at the time of the adjustment.

The threshold condition can be predetermined. It may include calculations based on percentage of ink coverage, pile height, color analysis, etc. For example, a threshold condition may be defined such that if the pile height of a black foreground area is X % greater than that of a non-black neighboring background area, then an adjustment will be needed. For example, X may be 25, 50, 75, 100 or more. For example, a pile height of the black area in the foreground of 125% or more than the pile height of a neighboring area could trigger the step of spatially dependent change of the pile height.

FIG. 5 depicts an image processing method. The targeted areas for pile height adjustment are determined by windowing an area in the determining unit. The window envelops the area, can be set, automatically or by a user, to various sizes and shapes, and can be set to grow or shrink based on the steepness of the variation in the estimated height profile. If only or mainly steep variations produce the halo effect, then a small window will be sufficient to detect the threshold conditions. However, if smoother transitions can also produce the halo effect then larger window sizes may be required. In addition, the threshold used can be based on the window parameter or contents. In addition, the threshold can be based on the preexisting substrate characteristics. For example, the stiffness, weight, transfer characteristics, grain direction can affect the ink transfer to the substrate.

In step S10, the estimated pile heights at different locations within a given area are determined, based on the ink coverage for each of the locations, and then it is determined whether the area of image data meets a transition steepness and threshold condition by contrasting the differences of the estimated pile heights of areas with that of their respective neighboring areas. The pile height differences will depend on the width of the areas, the steepness of the transition and the differences in area coverage. If the given area width, steepness and pile height difference is below the threshold then the method skips to step S40. If the differences are above the threshold conditions, then the method continues to S20 for image adjustment. In step S20, the pile heights of the respective areas are adjusted in a spatially dependent change. The concept of spatial dependence is that objects or characters are overlaid over other objects or backgrounds. Thus, pile height differences that occur at one point are likely to occur at other points or areas along or throughout the characters or objects. A spatially dependent change can be made based on ink, area or object level. For example, in FIG. 2, the image could be adjusted around the entire perimeter of the character "T." Alternatively, in step S20 in a preflight embodiment, a user can be notified and asked to select whether pile height adjustment is preferred.

In step S30, the locally adjusted vector data or raster data is stored in memory. In step S40, the method checks whether there are any more areas to check. If there are any remaining areas to be checked, the method returns to step S10. The method continues until all areas have been checked. In effect, steps S10-S30 of the image processing method of FIG. 5 iterate by determining estimated profile heights throughout the different areas throughout the entire image, and the entire document, or at least until a desired localized set of areas is checked. If there are no remaining areas to be checked, the estimated pile heights of inks are determined for a different area, which may partially overlap so that height adjustments do not depend on whether the foreground or the background is near the edge of the current area within the image, by comparing the pile heights of the different areas with the threshold. For example, in preflight software, the method can be applied locally to each new foreground object that is added to a vector data image. In step S50, the adjusted image, that is, the original image data with some of areas replaced by adjusted areas can be saved in memory or printed onto paper or other media.

Figure 6:
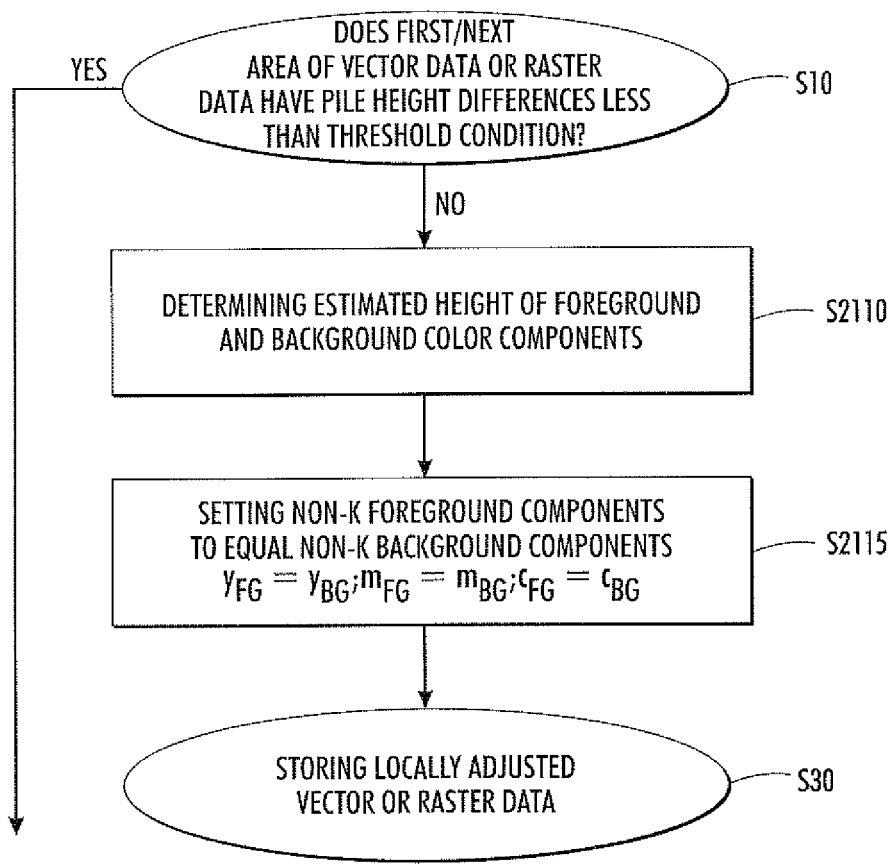
FIG. 6 is a flowchart illustrating a first exemplary portion of the image processing method depicted in FIG. 5.
Figure 12:
Figure 13:
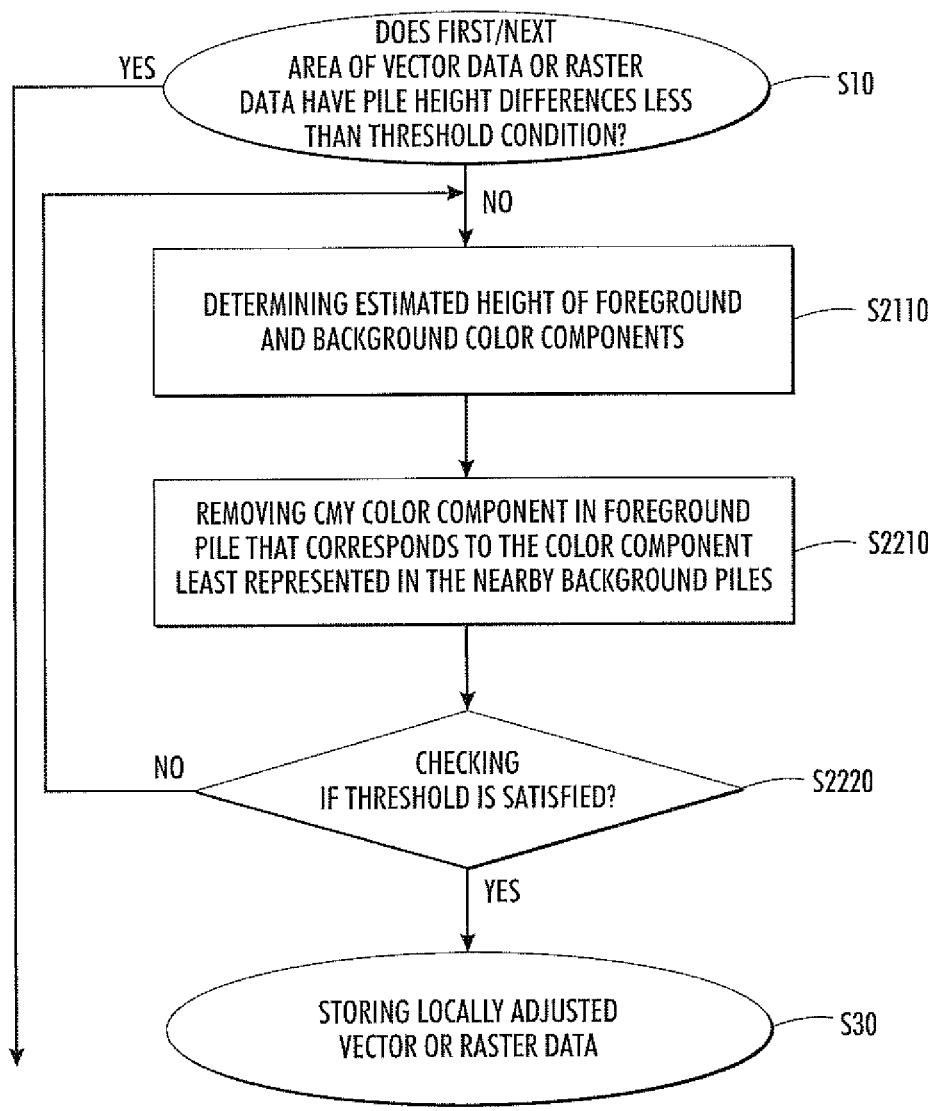
FIG. 13 is a flowchart illustrating a second exemplary portion of the image processing method depicted in FIG. 5.
Figure 15:
Figure 16:
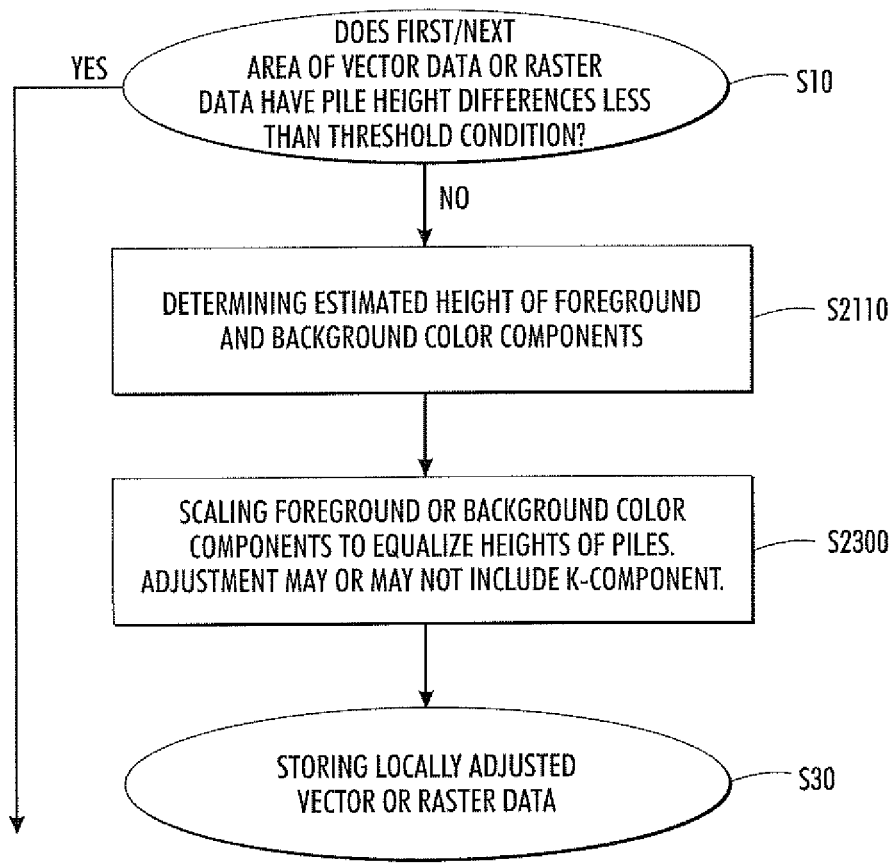
FIG. 16 is a flowchart illustrating a third exemplary portion of the image processing method depicted in FIG. 5.

FIGS. 6, 13 and 16 depict first, second and third exemplary portions of step S20 of the image processing method of FIG. 5. FIGS. 7-12, 14-15 and 17-18 are respectively examples of how the exemplary methods of FIGS. 6, 13 and 16 can be applied. These exemplary embodiments can be used individually or in combination to reduce the halo defect, and each may have different preferred thresholds or image area window sizes.

FIG. 6 illustrates an exemplary portion (step S20) of the image processing method of FIG. 5 in which the non-black foreground components are set to be equal to the non-black background components. In FIG. 6, continuing from step S10, the estimated pile heights of the color components of neighboring areas, e.g., foreground and background, are determined and can be stored in memory in step S2110. Unlike in step S10, the method in step S2110 may or may not perform a threshold comparison. Although steps S10 and S2110 can be performed as separate steps, these steps can also be combined or interchanged. In step S2115, the image processing method sets the non-K foreground components (CMY) to be equal to the background components (CMY) in accordance with equation 4. For example, the yellow of the foreground is set to be equal to the yellow of the background. If there is no yellow in the background, the yellow of the foreground is set to nil. Each of the MY colors are equated similarly.

$$y_{FG}=y_{BG}; m_{FG}=m_{BG}; c_{FG}=c_{BG} \quad \text{(equation 4)}$$

FIGS. 7-12 depict before and after examples of images adjusted by the image processing method of claim 6 when there are three areas in a row. The middle area corresponds to the foreground, and the left and right areas correspond to the background. In these examples, for simplicity, each color, if present, has 100% coverage ("1"). If not present, the color has a value of 0. FIGS. 7-12 illustrate how a pile height differences can be substantially reduced without a corresponding loss of image quality.

Figure 7:
FIGS. 7, 8, 9, 10, 11 and 12 illustrate examples of images formed by the image processing method depicted in FIG. 6.

FIG. 7 is an example where foreground ink CMYK is in an image where the background is white. Here, the method sets $c_{FG}=0$, $y_{FG}=0$ and $m_{FG}=0$. The K remains unchanged.

Figure 8:
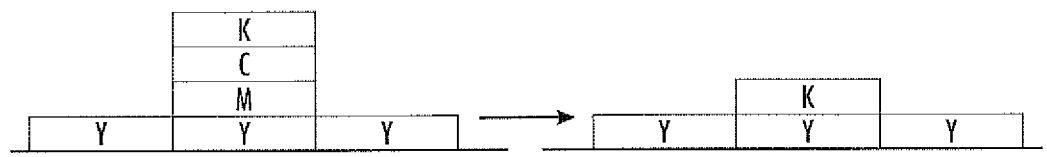

FIG. 8 is an example where black foreground area CMYK overlays a yellow background. Here, the method sets $c_{FG}=0$, $y_{FG}=1$ and $m_{FG}=0$. The K remains unchanged.

Figure 9:
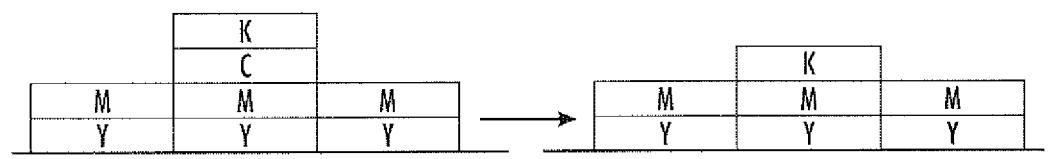

FIG. 9 is an example where black foreground area CMYK overlays an MY background. Here, the method sets $c_{FG}=0$, $y_{FG}=1$ and $m_{FG}=1$. The K remains unchanged.

Figure 10:

FIG. 10 is an example where black foreground area CMYK overlays a CY background. Here, the method sets $c_{FG}=1$, $y_{FG}=1$ and $m_{FG}=0$. The K remains unchanged.

Figure 11:
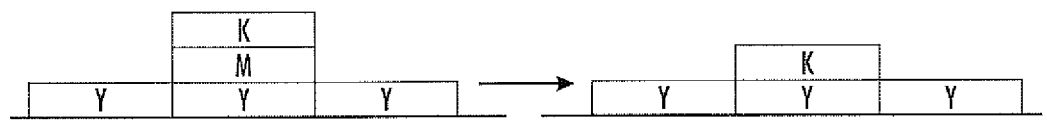

FIG. 11 is an example where black foreground area MYK overlays a yellow background. Here, the method sets $c_{FG}=0$, $y_{FG}=1$ and $m_{FG}=0$. The K remains unchanged.

FIG. 12 is an example where black foreground area CMK overlays a yellow background. Here, the method sets $c_{FG}=0$, $y_{FG}=1$ and $m_{FG}=0$. The K remains unchanged.

FIG. 13 illustrates a second exemplary portion (step S20) of the image processing method of FIG. 5 in which the non-black foreground components are successively eliminated until the pile heights of foreground and background are equal, or within an acceptable difference level. Step S2100 is the same as in S2100 of FIG. 6. In step S2210, one of the CMY color components of the foreground is removed based on the least represented background components. In step S2220, the equalization process may end or continue for the same image area, depending on the user choices and/or threshold condition. For example, if the image can be adjusted enough in the first iteration, only one iteration may be enough adjustment to satisfy the threshold condition. However, if not, the foreground may be able to be reduced further by continuing with other colors as needed without reducing image quality.

Figure 14:
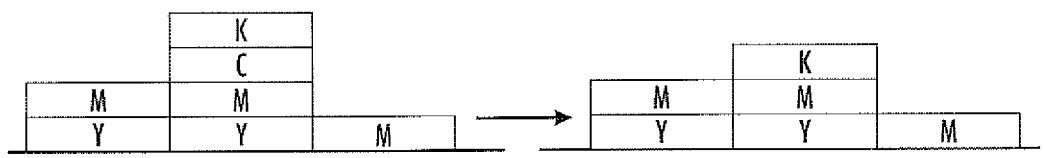
FIGS. 14 and 15 illustrate examples of images formed by the image processing method depicted in FIG. 13.

FIGS. 14 and 15 depict examples of the image processing method in the embodiment of FIG. 13. FIG. 14 is a first iteration. FIG. 15 is a second iteration.

FIG. 14 is an example where black foreground ink CMYK overlays a background of M on one side and MY on the other side. Here, before the first iteration, C is the least represented component of the background. Therefore, the method removes the C component from the foreground ink CMYK, resulting in foreground ink MYK.

After the first iteration, if the pile height differences are not satisfactory with the C already removed, the image processing method of FIG. 13 may iterate until the pile height differences are satisfactory. FIG. 15 is an example where black foreground ink MYK overlays a background of M on one side and MY on the other side. Because C has already been removed, C is no longer considered. The next least represented color is Y. Therefore, the image processing method removes the Y component out of the foreground inks MYK, resulting in foreground ink MK.

As shown in FIG. 14, the original ink height difference of 2 color components on the MY side and 3 color components on the M side, after the first iteration, was reduced to 1 color component on the MY side and 2 color components on the M side. As shown in FIG. 15, the original ink height difference was reduced to 0 color components on the MY side and 1 color components on the M side. In this way, the original ink height difference has been significantly reduced without much degradation of the perceived quality of the image. Alternatively the process is not iterative, and could be executed in one pass.

To illustrate the use of the threshold in this method, if the threshold amount required the height difference to be greater than "2" to qualify for image adjustment, the ink height difference after the first iteration would no longer qualify. However, if the height difference is greater than "1", the image processing method would iterate to the second iteration. By adjusting the threshold condition, a user can adjust the sensitivity of the image processing method.

FIG. 16 illustrates a third exemplary portion (step S20) of the image processing method of FIG. 5 in which the non-black foreground components are reduced such that the pile height of the foreground equals the pile height of the background. Alternatively, the pile height of the non-black foreground components equals the pile height of the background, or the ink pile height differences of the foreground and the background are adjusted until they are less than a threshold difference condition.

Non-black component colors can be scaled down equally, e.g., reduced each of the CMY components by the same scalar amount a. Here, linearity and limiting between 0 and 1 are assumed, but these assumptions can change depending on the image conditions. Equation 5 shows the scaled height of the CMY foreground equals the sum of the scaled heights of the CMY and the original height of the black component. Equation 6 sets the scaled foreground height (equation 5) equal to the background height (equation 3), and equation 7 calculates the scalar amount α by solving the equation for this variable.

$$\Pi_{\alpha FG} = \Pi_{Fay} + \Pi_{Fam} + \Pi_{Fac} + \Pi_{Fk} \quad \text{(equation 5)}$$

$$\Pi_{\alpha FG} = \alpha(\Pi_{Fy} + \Pi_{Fm} + \Pi_{Fc}) + \Pi_{Fk} \quad \text{(equation 6)}$$
$$= \Pi_{By} + \Pi_{Bm} + \Pi_{Bc} + \Pi_{Bk}$$

$$\alpha = \frac{\Pi_{By} + \Pi_{Bm} + \Pi_{Bc} + \Pi_{Bk} - \Pi_{Fk}}{(\Pi_{Fy} + \Pi_{Fm} + \Pi_{Fc})} \quad \text{(equation 7)}$$
$$= \frac{(y + m + c + k)_B - k_F}{y + m + c)_F}$$

Or alternatively to bring the pile heights within threshold conditions, again assuming linearity:

$$\alpha(\Pi_{Fy} + \Pi_{Fm} + \Pi_{Fc}) + \Pi_{Fk} - (\Pi_{By} + \Pi_{Bm} + \Pi_{Bc} + \Pi_{Bk}) < Th \quad \text{(equation 8)}$$

$$0 <= \alpha < \frac{Th + \Pi_{By} + \Pi_{Bm} + \Pi_{Bc} + \Pi_{Bk} - \Pi_{Fk}}{(\Pi_{Fy} + \Pi_{Fm} + \Pi_{Fc})} = \quad \text{(equation 9)}$$
$$\frac{p_{th} + (y + m + c + k)_B - k_F}{(y + m + c)_F}$$

The values p, c, m, y, k can represent a number of different quantities. They can be interpreted as area coverage percentages, or ink densities, or ink pile heights or any kind of unit that represents ink quantity deposited.

Figure 17:
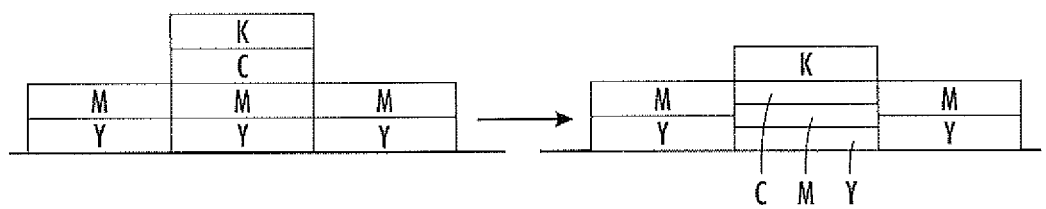
FIGS. 17 and 18 illustrate examples of images formed by the image processing method depicted in FIG. 16.

Step 2100 is the same as step s2100 of FIGS. 6 and 13. In Step S2300, the estimated pile height is scaled according to equations 6 and 7 or 8 and 9. The scaling factor may or may not include the component K. In this way, only the CMY component colors can be scaled, or the CMYK component colors can be scaled. More sophisticated scaling algorithms could be developed, with different scaling for each of the components, scaling of the background or scaling of the foreground and the background. The image processing method of FIG. 16 is illustrated in the examples of images in FIGS. 17 and 18. In FIG. 17, a black foreground pixel CMYK overlays a background of MY. The initial pile height difference is "2." FIG. 17 sets the non-black foreground components to be equal to the background components. As such, the 3 CMY foreground components need to be scaled by ⅔ to have the same pile height as the two MY background components. FIG. 17 shows the scaled foreground, where each of CMY is scaled by ⅔, and the amount of K is maintained. In this way, the initial pile height difference of "2" is reduced to "1". After equalization, FIG. 17 shows the respective piles as MY, [⅔-scaled CMY]-K and MY.

Figure 18:
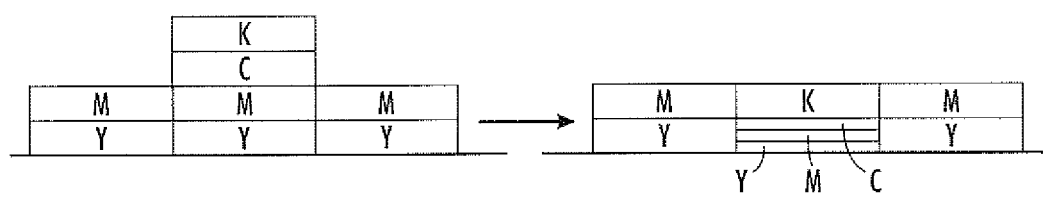

FIG. 18 shows a variation of the example of FIG. 17. Similar to FIG. 17, the initial pile height difference is "2". However, in FIG. 18, the entire foreground pile height including K is set to be equal to the entire background pile height, as opposed to only the non-black color components as depicted in FIG. 17. As was true in FIG. 17, the K is maintained. The background pile height of "2", if reduced by "1" (the amount of K), leaves only the height of "1" component of background to match the height of "3" non-black foreground components. As such, the "3" non-black foreground components are scaled by ⅓ in such a way that the non-black foreground components fit into the space of "1" component color of background. After equalization, FIG. 18 shows the top layer to be MKM and the bottom layer to have Y-[⅓-scaled CMY]-Y. In this way, the initial pile height difference of "2" is reduced to "0."

The embodiment of FIG. 16 is similar to the embodiment of FIG. 13 in that the sensitivity can be adjusted. Based on the size of the threshold, the image processing apparatus may choose the variation in FIG. 17 or 18. Many different ways can be devised to equalize pile height and reduce halo.

It will be appreciated that some of the various methods herein, depending on the pile height configurations, will result in the same outcome and some will result in different outcomes.

In addition to the above-described benefits, the embodiments discussed herein have the advantage of printing text and/or graphics onto graphics without surrounding halos. Another advantage is reducing differential gloss resulting from high ink mass regions (applies to all media weights). The embodiments herein also reduce the amount of ink required to print image data. The embodiments herein can also help to equalize printed document thickness, e.g., a stack of pamphlets or books would have the thickness of respective ink pile heights in the same areas, causing possible unevenness of the stack.

It will be understood to those of skill in the art that the ink pile height reduction can be performed on systems other than CMYK-based systems, in other color spaces and on multi-ink systems, e.g., six-toner systems, or with clear color solution and ink jet printing. In some cases, such as in packaging, the black could really be a dark blue or a dark brown, or some other color; in other cases it could be an opaque color, such as an opaque white or a metallic. With an opaque top color, the top color has a significant effect on the object color appearance, and the other components can be manipulated (i.e. reduced or increased) without changing the color of the object too much. In the examples cited above, the K was both the top color and the dominating color. K, however, is typically not opaque. It will be appreciated that the top color could be a different color.

The change in color appearance of the object (foreground or background) could be another boundary condition for decreasing the pile height difference, or it could be another parameter in determining which pile height difference adjustment method is selected. For instance if in some case pile height difference can be brought within the threshold through elimination of Y or M, and the elimination of Y has a smaller influence on the resulting object color, then one may opt to take out Y and leave M, if the resulting color of the object is important. This will depend on the exact nature of the system and its colorants.

A "tenting deletion" is defined in U.S. Pat. No. 5,689,344 to Ebner as "Insufficient development of a low pile height next to a high pile height." It can have a similar type of visual effect. The embodiments discussed herein can also address "tenting deletions." However, although the '344 patent describes a solution to the "tenting deletion" problem, the methods described in the '344 patent cannot cure the halo defect.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. An image processing apparatus comprising:
   a controller, the controller controlling the image processing apparatus to perform a method of adjusting ink pile height,
   the method comprising the steps of:
   determining, in an area of image data having a foreground and a background, an estimated ink pile height profile of ink to be deposited on a corresponding area of a surface by an image forming device, the estimated ink pile height profile including a major color component in the foreground, plurality of non-major color components in the foreground, a plurality of non-major color components in the background, plurality of major color components in the background, and a black component in the foreground;
   adjusting the estimated ink pile height profile through a spatially dependent change of ink at the area until the adjusted ink pile height difference in the area is below a threshold;
   wherein the spatially dependent change of the ink includes:
   (1) removing one of the plurality of non-major color components of the foreground whose corresponding color component is least represented out of the plurality of non-major color components of the background in the area;
   (2) after the removing one of the plurality of non-major color components, equating the amount of each of remaining ones of the plurality of non-major color components in the foreground with a corresponding non-major color component in the background; and
   (3) scaling each of the remaining non-major color components of the foreground by a factor α, so that the foreground and background have ink pile height differences below a threshold value,
   wherein α is based on a ratio of a sum of the major and non-major color components of the background minus the black component of the foreground to a sum of the major and non-major color components of the foreground; and
   storing or causing an image forming device to print an image based on the adjusted estimated height profile.

2. The image processing apparatus of claim 1, wherein the major color component is a color that visually dominates a combination of the major color component and the at least one non-major color component.

3. The image processing apparatus of claim 1, wherein the major color component is an opaque ink that is located on the top of the estimated pile height at the foreground, and the plurality of non-major color components are not located on the top of the estimated pile height at the foreground.

4. The image processing apparatus of claim 1, wherein the image data is at least one of raster image data, text data or vector data.

5. The image processing apparatus of claim 1, wherein the surface is an intermediate transfer belt.

6. The image processing apparatus of claim 1, wherein the ink pile height is a function of ink quantities, as used by the image forming device.

7. The image processing apparatus of claim 1, wherein the image data is in the color space of the image forming device before the determining of the estimated ink pile height profile.

8. The image processing apparatus of claim 1, wherein the determining and the adjusting are performed in a preflight application.

9. The image processing apparatus of claim 1, wherein the spatially dependent change of the ink includes
   changing one of the plurality of non-major color components of the background.

10. An image processing method, the method comprising the steps of:
    determining, in an area of image data having a foreground and a background, an estimated ink pile height profile of ink to be deposited on a corresponding area of a surface by an image forming device, the estimated ink pile height profile including a major color component in the foreground, a plurality of non-major color components in the foreground, a plurality of non-major color components in the background, a plurality of major color components in the background, and a black component in the foreground;
    adjusting the estimated ink pile height profile through a spatially dependent change of ink at the area until the adjusted ink pile height difference in the area is below a threshold;
    wherein a controller controls the image forming device to adjust ink pile height; and
    wherein the spatially dependent change of the ink includes:
    (1) removing one of the plurality of non-major color components of the foreground whose corresponding color component is least represented out of the at least one non-major color component of the background in the area;
    (2) after the removing one of the plurality of non-major color components of the foreground, equating the amount of each of the remaining plurality of non-major color components in the foreground with a corresponding non-major color component in the background; and
    (3) scaling each of the remaining plurality of non-major color components of the foreground by a factor α, so that the foreground and background have ink pile height differences below a threshold value,
    wherein α is based on a ratio of a sum of the major and non-major color components of the background minus the black component of the foreground to a sum of the major and non-major color components of the foreground; and
    storing or causing the image forming device to print an image based on the adjusted estimated height profile.

11. The image processing method of claim 10, wherein the major color component is a color that visually dominates a combination of the major color component and the at least one non-major color component.

12. The image processing method of claim 10, wherein the major color component is an opaque ink that is located on the top of the estimated pile height at the foreground, and the plurality of non-major color components are not located on the top of the estimated pile height at the foreground.

13. The image processing method of claim 10, wherein the spatially dependent change of the ink includes
  scaling each of the remaining plurality of non-major color components of the foreground by the same fraction so that the foreground exclusive of the major color component and the background have the same estimated height.

14. The image processing method of claim 10, wherein the image forming device is a digital printing machine.

15. The image processing method of claim 10, wherein the estimated ink pile height of the background is increased by scaling the plurality of non-major color components of the background.

16. The image processing method of claim 10, wherein the estimated ink pile height of the background is increased by adding at least one non-major color component of the background.

* * * * *